United States Patent [19]

Kano et al.

[11] Patent Number: 4,918,130

[45] Date of Patent: Apr. 17, 1990

[54] ERASER

[75] Inventors: Yosimi Kano; Koji Seki; Ryoichi Seki, all of Saitama, Japan

[73] Assignee: Buncho Corporation, Tokyo, Japan

[21] Appl. No.: 282,062

[22] Filed: Dec. 9, 1988

Related U.S. Application Data

[63] Continuation-in-part of Ser. No. 55,853, Jun. 1, 1987, abandoned.

[30] Foreign Application Priority Data

Feb. 10, 1987 [JP] Japan .................................. 62-28746

[51] Int. Cl.$^4$ .................. C08K 3/00; C08L 23/06; C08L 23/12; C08L 53/02
[52] U.S. Cl. .................................... 524/499; 524/413; 524/423; 524/426; 524/427; 524/430; 524/445; 524/448; 524/451; 524/487; 524/505; 524/525; 525/98; 525/240
[58] Field of Search .................. 525/98, 240; 524/505, 524/525, 426, 423, 499, 427, 451, 413, 430, 445, 448, 487

[56] References Cited

U.S. PATENT DOCUMENTS

| | | | |
|---|---|---|---|
| 4,305,990 | 12/1981 | Kelly | 525/98 |
| 4,374,225 | 2/1983 | Kawakuba et al. | 524/302 |
| 4,386,188 | 5/1983 | Grancio et al. | 525/98 |
| 4,418,123 | 11/1983 | Bonnelle et al. | 525/98 |
| 4,578,920 | 3/1986 | Handl | 524/490 |
| 4,721,739 | 1/1988 | Brenneman et al. | 524/505 |
| 4,743,636 | 5/1988 | Bersano | 524/451 |
| 4,753,989 | 6/1988 | Hudson Jr. | 525/905 |
| 4,761,451 | 8/1988 | Moteki et al. | 524/451 |

Primary Examiner—Allan M. Lieberman
Attorney, Agent, or Firm—Burns, Doane, Swecker & Mathis

[57] ABSTRACT

An eraser comprises a styrene thermoplastic elastomer as a matrix with a hydrocarbon resin and a polyolefin included therein. The styrene thermoplastic elastomer is selected from the group which consists of styrene-butadiene copolymers, styrene-isoprene copolymers, styrene-ethylene-butylene copolymers and styrene-ethylene-propylene copolymers, and the hydrocarbon is a terpene resin or hydrogenated terpene resin, and the polyolefin is polyethylene or polypropylene.

7 Claims, No Drawings

ERASER

CROSS REFERENCE TO RELATED APPLICATIONS

This application is a continuation-in-part of application Ser. No. 055,853, filed on June 1, 1987, now abandoned.

BACKGROUND OF THE INVENTION (1) Field of the Invention

The present invention relates to an eraser, more particularly to an eraser which is capable of efficiently erasing marks made with plastic crayons, and which is extremely safe.

(2) Prior Art

Natural rubber erasers and plastic erasers are conventionally known. The former type has natural rubber as a matrix, and factice and a filler mixed with it. Then it is finished by being semi-vulcanized in sulfur. The latter type has an emulsion polymerized type of vinyl chloride resin as a matrix, and a filler or the like is mixed with it so as to be kneaded with an excess of a plasticizer. Then it is steam heated or the like so as to half-set the resin.

However, when preparing a natural rubber eraser, it is necessary to include a vulcanization step, which complicates the overall process. Furthermore, there is a disadvantage as it is impossible to reuse the waste generated while cutting the semivulcanized material. A plastic eraser has a problem concerning safety if a child for example should put it in his mouth since it contains a plasticizer. Various novel plastic erasers have been proposed. For example, there have been proposed one in which factice and process oil are added to a thermal plastic elastomer (Japanese Patent Publication No. 23450/1971), and on in which an ethylene-vinyl acetate copolymer and/or an atactic polypropylene resin, or a styrene-butadiene copolymer is used, to which a plasticizer is added (Japanese Patent Publication No. 32680/1982). However, all have insufficient characteristics as erasers. Moreover, these conventional erasers cannot erase marks made with plastic crayons which have been developed recently.

SUMMARY OF THE INVENTION

This invention is based upon the knowledge that an eraser which has a styrene type of thermoplastic elastomer as a matrix and in which both hydrocarbon resin and a polyolefin are mixed can overcome the above problems efficiently.

It is, therefore, a primary object of the present invention to provide an eraser which is easy to manufacture and has no problems from the point of view of safety, and which has superior characteristics as an eraser, in particular, being capable of efficiently erasing marks made with plastic crayons.

This and other objects of the present invention will be clear from the following description.

In accordance with the present invention, there is provided an eraser comprising a styrene type of thermoplastic elastomer as a matrix with a hydrocarbon resin and a polyolefin contained therein.

DESCRIPTION OF THE PREFERRED EMBODIMENTS

The styrene thermoplastic elastomer which may be used in the present invention generally has a number average molecular weight of from 50,000 to 200,000. It is preferable to use a styrene thermoplastic elastomer chosen from the group consisting of block copolymers of styrene-butadiene (SBS), styrene-isoprene, styrene-ethylene-butylene, and styrene-ethylene-propylene. In this regard, it is further preferable that the SBR copolymers containing 25 to 50% by weight, more preferably 35 to 45% by weight of styrene, styrene-isoprene copolymer containing 14 to 21% by weight of styrene, styrene-ethylene-butylene copolymers containing 14 to 29% by weight of styrene, or styrene-ethylenepropylene copolymers containing 35 to 40% by weight of styrene be used.

Readily available examples of these styrene thermoplastic elastomers include that sold by SHELL CHEMICAL CO., LTD., under the trade name 'Cariflex TR', or by ASAHI CHEMICAL INDUSTRY CO., LTD., under the trade name 'Tufprene' or 'Solprene', or by NIPPON SYNTHETIC RUBBER INDUSTRY CO., LTD., under the trade name 'JSR TR'.

In this invention, the styrene thermoplastic elastomer is used as a matrix and its ratio to the total weight of the eraser is in the range of, for example, 15 to 50 percent by weight (abbreviated to % hereinafter), more preferably in the range of 25 to 40%.

The hydrocarbon resin which is added to the above matrix is a thermoplastic resin polymerized from chain hydrocarbon components or cyclic hydrocarbon components contained in petroleum, natural gas, natural rubbers and terpene oils. Although various resins may be used, terpene resins, hydrogenated terpene resins, aromatic petroleum resins, hydrogenated aromatic petroleum resins, aliphatic petroleum resins or the like are specifically mentioned herein. It is preferable to use a hydrogenated type of resin because it has no odor or color.

The aforesaid terpene resins are available from SUMITOMO CHEMICAL CO., LTD., NIPPON ZEON CO., LTD., and YASUHARA YUSHI KOGYO CO., LTD. Hydrogenated terpene resin is sold by YASUHARA YUSHI KOGYO CO., LTD., under the trade name 'Clearon'. Petroleum resins such as aromatic petroleum resins, hydrogenated aromatic petroleum resins and aliphatic petroleum resins are easily available as 'Hi-Rez', 'Petrosin' (registered trademark), and "FTR' (registered trademark) made by Mitsui Petrochemical Industries Ltd., and Neopolymer' (registered trademark) made by Nippon oil Co., Ltd.

In the present invention, although a polyolefin may be used in various percentages, the hydrocarbon resin may be used in the proportion of 1 to 30%, preferably 3 to 10% by weight. The amount of polyolefin used may be in the weight ratio of 3 to 1 parts of polyolefin to 1 to 2 parts of hydrocarbon resin, preferably 1 to 2 parts of polyolefin to 1 part of hydrocarbon resin. The weight ratio of the total amount of polyolefin and hydrocarbon resin to styrene thermoplastic elastomer may be 1:10 to 6:10, preferably 3:10 to 5:10.

Illustrative polyolefins are polyethylene having a number average molecular weight of from 20,000 to 44,000 and a melt index (MI) of from 3 to 45 and polypropylene having a number average molecular weight of from 3,000 to 15,000 and a melt index (MI) of from 1 to 30.

In the present invention, in addition to the essential composition given above, various additives may be added if necessary. These additives may, for example, be fillers such as calcium carbonate, clay, talc, barium sulfate, silica, aluminum oxide, titanium oxide, diatomaceous earth and glass powders; softeners such as process oil, polybutylene, chlorinated paraffin and liquid paraffin; colorants, perfumes, stabilization agents, lubricants; and thermal plastic resins and thermal plastic elastomers which are not specifically disclosed in this application. It is preferable to use 25 to 60% by weight of a filler, and 1 to 15% by weight of a softener. The eraser according to the present invention can be prepared in any desired form by premixing the above materials with a Henschel mixer, then kneading the mixture in a kneader, Banbury mixer or rolls and pelletizing it in a pelletizer before injection molding it.

According to the present invention, the eraser, which can be easily manufactured, has no problems from the viewpoint of safety and has superior characteristics as an eraser. The eraser according to the present invention can be used widely not only for ordinary purposes but also for erasing marks made with plastic crayons, which are said to be difficult to erase.

The present invention is explained by the following non-limitative Examples.

EXAMPLE 1

The composition was as follows:

| | |
|---|---|
| Styrene-butadiene copolymer [JSR TR1000 prepared by Japan Synthetic Rubber Co., Ltd.; MI 1.5; styrene content 40%] | 30% by weight |
| Polyethylene (MI 5) [Yukaron HD JX21 (high-density) prepared by Mitsubishi Petrochemical Co., Ltd.] | 18% by weight |
| Terpene resin [YS resin PX-1000 prepared by Yasuhara Yushi Kogyo Co., Ltd.] | 10% by weight |
| Calcium carbonate [average particle size 3.2 μm] | 40% by weight |
| Process oil [Dianaprocess PW-90 prepared by Idemitsu Kosan Co., Ltd.; Mn 539] | 2% by weight |

An eraser (hard eraser) was prepared by injection molding the above composition after it had been kneaded.

The eraser according to this embodiment could completely erase letters written on paper by a plastic crayon.

EXAMPLE 2

The composition was as follows:

| | |
|---|---|
| Styrene-butadiene copolymer [Solprene T-475 prepared by JAPAN ELASTOMER Co., Ltd.; MI 0.7] | 40% by weight |
| Polypropylene (MI 20) [Norbrene FL25 prepared by Mitsubishi Petrochemical Co., Ltd.] | 6% by weight |
| Hydrogenated terpene resin [Clearon P125 prepared by Yasuhara Yushi Kogyo Co., Ltd.; $\overline{M}$ 700] | 4% by weight |
| Calcium carbonate [average particle size 3.2 μm] | 32% by weight |
| Chlorinated paraffin [Enpara 40 prepared by Ajinomoto Co., Inc.: Cl content 40%] | 15% by weight |
| Titanium oxide [TI-PURE R-902 prepared by DuPont] | 3% by weight |

An eraser (soft eraser) was prepared by injection molding the above composition after it had been kneaded.

The eraser according to this embodiment could completely eraser letters written on paper by a plastic crayon.

COMPARISON EXAMPLE 1

An eraser which was prepared by omitting the polyethylene from the composition of Example 1 could not erase any letters written on paper by a plastic crayon, and could not sufficiently erase letters written by a pencil.

COMPARISON EXAMPLE 2

An eraser which was prepared by omitting the hydrogenated terpene resin from the composition of Example 2 could erase letters written on paper by a pencil, but it skidded over letters written on paper by a plastic crayon and merely smudged them.

EXAMPLE 3

The composition was as follows:

| | |
|---|---|
| Styrene-isoprene copolymer [Cariflex TR 1107 prepared by Shell Kagaku K.K.; MI 9; styrene content 14%] | 45% by weight |
| Polyethylene (MI 10) [Santec LD L6810 prepared by ASAHI CHEMICAL INDUSTRY CO., LTD.] | 3% by weight |
| Aliphatc petroleum resin [Hi-rez R-100X prepared by Mitsui Petrochemical Industries, Ltd.: Mn 1200] | 3% by weight |
| Calcium carbonate [average particle size 3.2 μm] | 38% by weight |
| Polybutylene [OH prepared by Idemitsu Petrochemical Co., Ltd.; Mn 350] | 10% by weight |
| Aliphatic metallic salt [AFCO CHEM CS prepared by ADEKA FINE CHEMICAL CO., LTD.] | 1% by weight |

An eraser which was prepared by injection molding the above composition after it had been kneaded could completely eraser letters written on paper by a plastic crayon.

EXAMPLE 4

The composition was as follows:

| | |
|---|---|
| Styrene-isoprene copolymer [Cariflex TR 1107 prepared by Shell Kagaku K.K.; MI 9; styrene content 14%] | 9% by weight |
| Styrene-butadiene copolymer [Cariflex TR 1101 prepared by Shell Kagaku K.K.; MI <1; styrene content 30%] | 16% by weight |
| Polyethylene (MI 25) [Lexron J61 prepared by Nippon Petrochemicals Co., Ltd.; low density] | 6% by weight |
| Polystyrene [DICSTYRENE GH-6300 prepared by DAINIPPON INK & CHEMICALS, INC.; MI 11] | 4% by weight |
| Hydrogenated aromatic petroleum resin [ESCOREZ5300 prepared by Exxon Chemical Japan Ltd.] | 11% by weight |
| Calcium carbonate [average particle size 3.2 μm] | 44% by weight |
| Liquid paraffin [CRYSTOL 70 prepared by Esso Sekiyu K.K.] | 10% by weight |

An eraser which was prepared by injection molding the composition after it had been kneaded could completely eraser letters written on paper by a plastic crayon.

What is claimed is:

1. An eraser comprising 15 to 40% by weight of a styrene thermoplastic elastomer as a matrix with 1 to 30 % by weight of a hydrocarbon resin which is a thermoplastic resin polymerized from chain hydrocarbon components or cyclic hydrocarbon components contained in petroleum, natural gas, natural rubbers or terpene oils and a polyolefin selected from the group consisting of polyethylene and polypropylene in a weight ratio of polyolefin to hydrocarbon resin of from 3/1 to 1/2 and from 25 to 60% by weight of an inorganic filler, said hydrocarbon resin, polyolefin and inorganic filler being contained in the matrix.

2. An eraser according to claim 1, wherein said hydrocarbon resin is selected from the group consisting of terpene resins, hydrogenated terpene resins, aromatic petroleum resins, hydrogenated aromatic petroleum resins and aliphatic petroleum resins.

3. An eraser according to claim 1, wherein said hydrocarbon resin is a terpene resin or a hydrogenated terpene resin.

4. An eraser according to claim 1, wherein said thermoplastic elastomer is selected from the group consisting of styrene-butadiene copolymers, styrene-isoprene copolymers, styrene-ethylene-butylene copolymers and styrene-ethylenepropylene copolymers.

5. An eraser according to claim 1, wherein said elastomer is contained in an amount of 25 to 50% by weight.

6. An eraser according to claim 1, wherein the weight ratio of total amount of the polyolefin and the hydrocarbon resin to the styrene thermoplastic elastomer is 1/10–6/10.

7. An eraser according to claim 1, wherein a softener is further contained in an amount of 1 to 15% by weight.

* * * * *